UNITED STATES PATENT OFFICE.

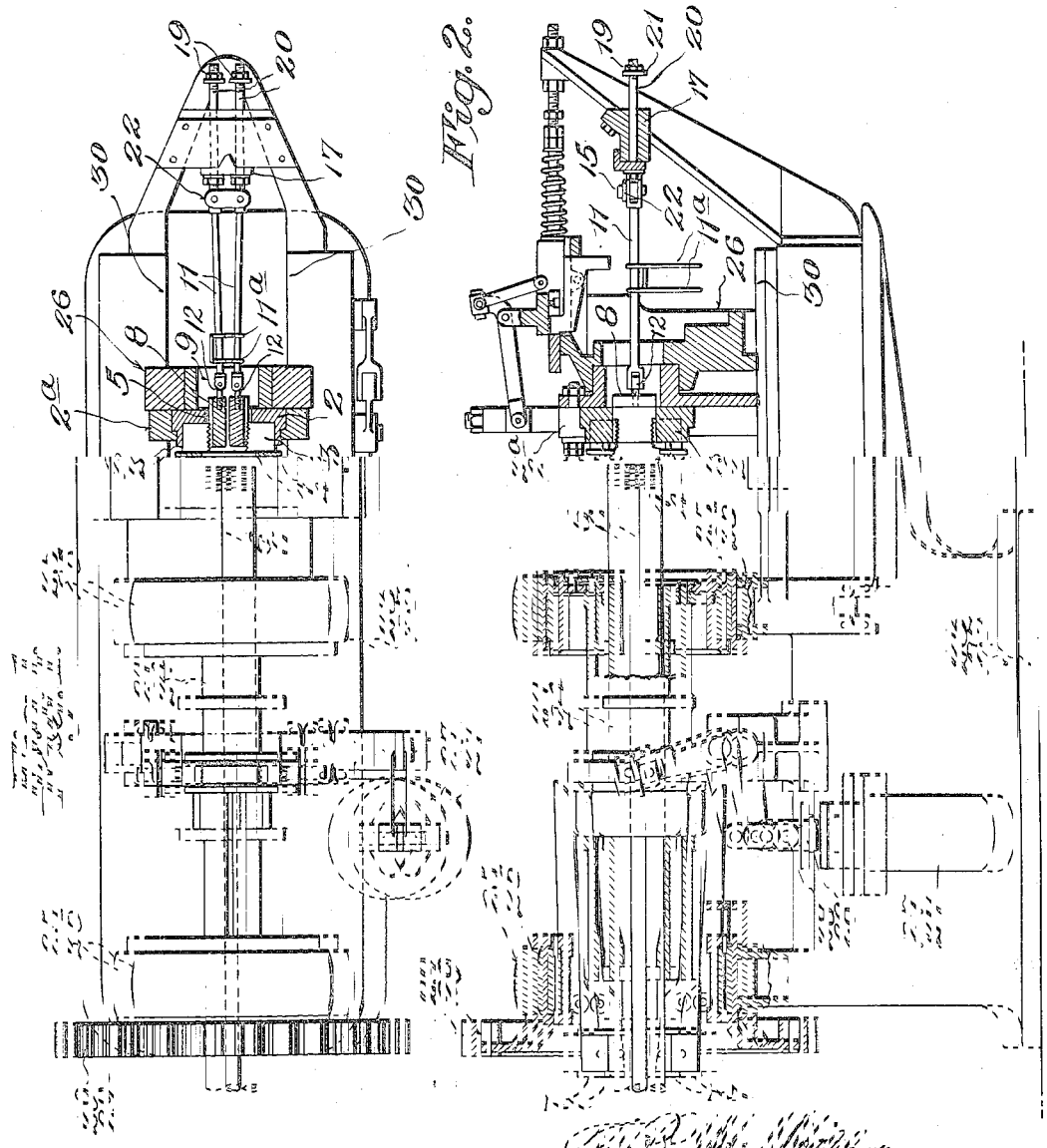

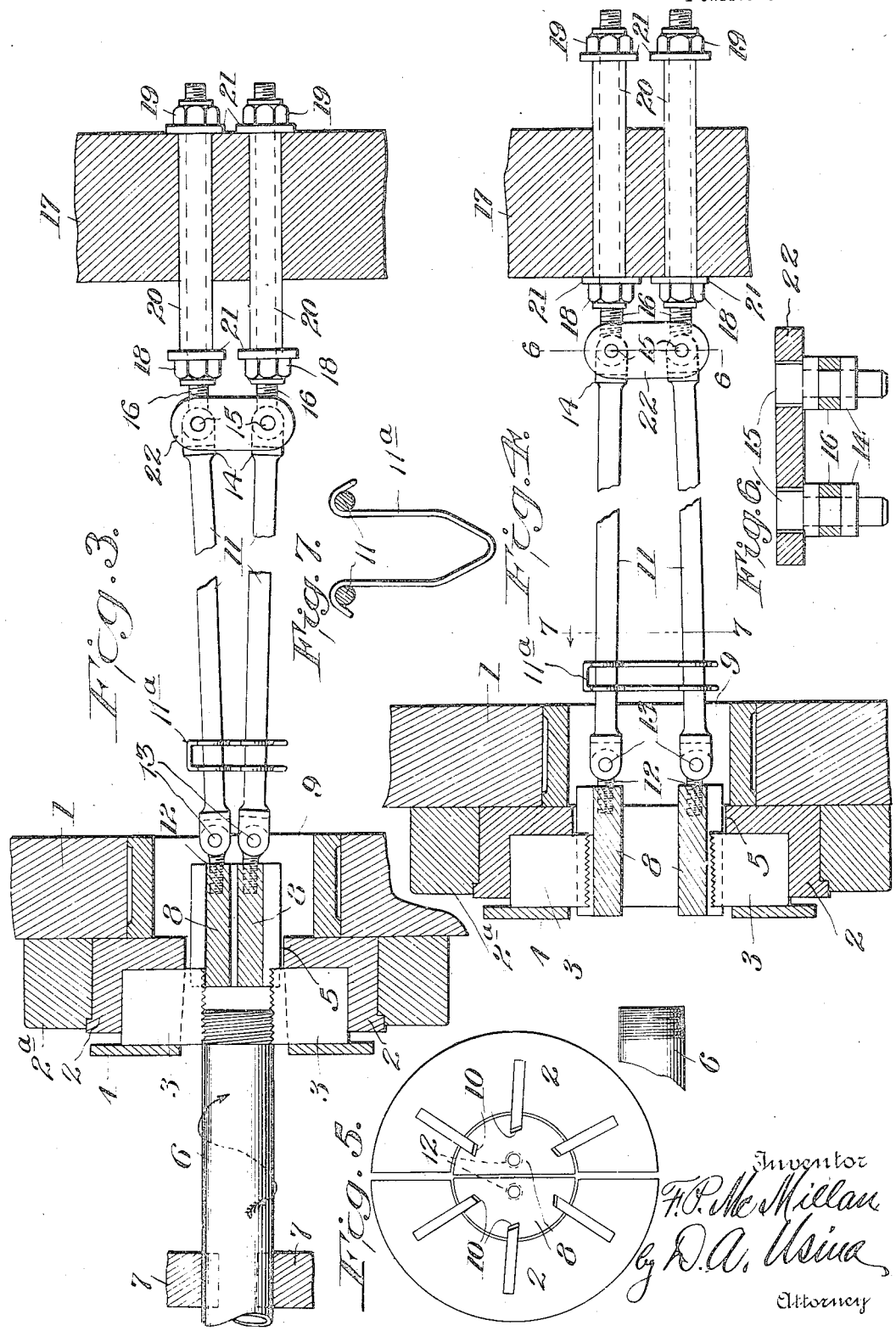

FRANK P. McMILLAN, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

SCREW-THREADING APPARATUS.

1,265,467.     Specification of Letters Patent.     Patented May 7, 1918.

Application filed December 4, 1917. Serial No. 205,377.

*To all whom it may concern:*

Be it known that I, FRANK P. McMILLAN, a citizen of the United States, and resident of Pittsburgh, in the county of Allegheny and State of Pennsylvania, have invented certain new and useful Improvements in Screw-Threading Apparatus, of which the following is a specification.

This invention relates to screw threading apparatus and more particularly to pipe threading apparatus used in cutting threads upon the ends of wrought metal pipes or tubes and has for its object the provision of means for removing the chips or cuttings formed or produced by the bits or chasers of the threading apparatus in the thread cutting operations and to accomplish their removal automatically and immediately following the completion of the thread cutting operation and also to efficiently remove the chips or cuttings without loss of time and without interruption or change in the operation of the threading apparatus in any manner whatsoever.

With these and other objects in view, the present invention consists in the novel constructions, combinations, and arrangement of parts, shown in the drawings, as will be hereinafter more fully described, and as is particularly set forth in the appended claims, it being premised that changes in the form, proportion, size, and minor details may be made within the scope of the claims, without departing from the spirit or sacrificing any of the advantages of the invention.

In the accompanying drawings, forming part of this specification, Figure 1 is a plan, partly in section, showing a pipe threading apparatus having a chip cleaning or removing device constructed and arranged and applied for use thereon in accordance with my invention.

Fig. 2 is a sectional side elevation of the apparatus shown in Fig. 1.

Fig. 3 is a sectional plan showing details in the construction of the threading die and the chip cleaning or removing device forming this invention, the die and cleaning device being shown in their positions at the completion of the threading operations.

Fig. 4 is a similar plan showing the die and cleaning device retracted and removed from the threaded pipe.

Fig. 5 is an elevation showing a front face view of the threading die with the retaining face plate removed.

Fig. 6 is a sectional elevation on the line VI—VI of Fig. 4 showing a modification in the construction of the connection between the stems and I bolts for the clearing blocks of my improved apparatus.

Fig. 7 is a sectional end elevation, on the line VII—VII of Fig. 4, showing the application of the compression spring to the stems forming part of my improved apparatus.

For the purpose of illustrating its application and operation, a pipe threading machine, of old and well known construction, is shown having the die-cleaning mechanism forming this invention applied for use thereon. This threading machine has a frame or base 23 with a pipe-turing barrel 24 rotatably mounted in bearings 25, 25 at one end and a reciprocatory die-holding carriage 26 at the other end thereof. The barrel 24 is provided with the pipe-gripping jaws 7, 7 which are open and closed by means of the fluid pressure cylinder 27, the piston 28 for this cylinder being operatively connected to the gripping jaws 7, 7 by suitable system of rock-shafts and levers. A driving motor (not shown) is operatively connected to the spur gear 29 on one end of the barrel 24 of the threading machine so as to positively rotate the barrel in the pipe-threading operation.

The reciprocatory carriage 26 is slidably mounted on ways 30, 30 formed on the frame 23 to move toward and away from the pipe rotating barrel 24, and removably secured on one face of the carriage 26 is an annular threading die holder or chuck 2ª, the chuck being made in two symmetrical sections. The chuck 2ª has a transversely split die 2 and the inner surface of the bore or axially central opening 5 in the sectional die 2 is interrupted by a series of radial recesses or slots. Positioned within these slots, are the thread cutting bits or chasers 3, of which six are shown, three in each section of the split die 2. The chasers, which are adjustable lengthwise within the radial slots in order to bring them into proper thread cutting position when resharpened after extended use, are held in place by a removable face plate 4.

The bits or chasers 3 project radially into the bore or circular opening 5 in the annular die and the end of the pipe or tube 6 enters between the bits or chasers 3 in being threaded. While being threaded the pipe or tube 6 is gripped between the jaws 7 on the barrel 24 and is positively rotated therewith. The carriage 26 of the threading machine will be advanced horizontally on the ways 30, 30 in moving the bits or chasers 3 into cutting engagement with the end of the pipe 6. After being brought into cutting engagement with the pipe, the chasers will automatically feed the die 2 forwardly on the pipe as the threads form on the end thereof.

As will be seen by reference to Figs. 3, 4, 5, and 6 of the drawings, the two sections of the chuck or die holder $2^a$ and die 2 are moved toward and away from each other in shifting the chasers into and out of engagement with the end of the pipe 6. Positioned in line with the axial opening 5 in the die 2 and arranged to move within the opening 5 and opening 9 relative to the chasers 3, are two semi-cylindrical blocks 8, 8, these blocks forming the wiping member or chip removing and die cleaning means of my improved apparatus. The blocks 8 are of a size to substantially fill the opening 5 in the die 2 and the curved or semi-cylindrical outer surfaces of these blocks are provided with a series of radial slots or grooves 10 into which the cutting ends of the chasers 3 project, the grooves 10 registering with the radial slots in the segments of the die 2 in which the chasers are secured. As the width of the slots 10 is substantially the same as that of the chasers 3 the sectional plug or cleaner formed by the blocks 8, 8 will move radially each with the section of the die in which it is mounted, the chasers 3 on account of their radial position forming a connection between each block 8 and its segment of the die 2 and causing the blocks 8 to move radially with the die sections 7 when the die sections are moved into and out of the closed or threaded cutting position without interfering with the relative reciprocating movement of the chasers 3 and chip removing blocks 8. (See Fig. 5.) Each of the grooves or channels 10 is open at the opposite ends thereof to facilitate the introduction and removal of the necessary blocks 8, and to permit of the necessary movement of the bits or chasers with respect to the cleaner blocks in removing the chips or cuttings.

Each wiping member or cleaner block 8 is supported by means of a stem or rod 11 which has forked ends and which is pivotally connected at its forward end to the rear end of the block. A satisfactory form of connection consists of an eye bolt 12 threaded into the rear end of the block and received in the forward end of the stem or rod 11, a suitable pin 13 connecting these parts together. The rear end 14 of each stem or rod 11 is pivotally connected by a pin 15, to an eye bolt 16 which passes loosely through a stationary stop 17 on the arm $17^a$ of the threading machine base 23. The eye bolts 16 are capable of endwise movement through the stop 17, and this endwise movement is limited by means of washers 21, 21 adjustably secured in place on the threaded shank of the eye bolts 16 by a thimble or sleeve 20 and nuts 18 and 19. Preferably a separator 22 secured on the pivot pins 15 is employed to maintain the eye bolts 16 in parallel relation, the eye bolts and sleeve 20 being slidably connected to the stop 17.

A spring $11^a$ made of heavy wire and having bent ends which embrace the rods 11, 11 (see Fig. 7), is secured on the block end of the stems or rods 11, 11 to assist in moving the rods 11 outwardly from the position shown in Fig. 3 into that shown in Fig. 4 and to prevent the blocks from binding on the chasers 3.

The operation of the apparatus will now be described. With apparatus constructed and arranged as shown and described, the tube or pipe 6 is gripped by the jaws 7, 7 on the barrel 24 and the barrel is started to rotate in the usual manner. The carriage 26 is then moved forwardly by hand to bring the bits or chasers 3 into contact with the end of the now rotating pipe 6, whereupon the latter will be threaded in the usual way. After the thread cutting operation is commenced the chasers 3 and the threads cut on the pipe co-act to mechanically feed the carriage 26 forwardly on the pipe. The cleaner blocks 8 forming the wiper elements or members, of course, travel forwardly with the carriage 26 and threading die 2, until they are stopped by contact of the rear washers 21 on the eye bolts 16 with the rear face of the stationary stop 17. The reciprocating carriage 26, of course, has a greater movement than the cleaner blocks 8, to enable the bits or chasers 3 to cut the threads on the end of the pipe 6 without interference by the blocks 8. After the pipe has been completely threaded, when the parts will be in position shown in Fig. 3, the bits or chasers are retracted radially so as to become disengaged from the pipe, and the carriage 26 is then moved backwardly on the ways 30, 30 (until in the position shown in Figs. 2 and 3). During the initial reverse or backward travel of the carriage, the cleaner blocks 8 will move rearwardly therewith until the front stops 21 on the eye bolts 16 come into contact with the front side of the stationary stop 17, whereupon further rearward travel of the carriage results in movement of the bits or chasers 3 through the grooves or channels in the now stationary cleaner blocks 8. This movement of the chasers relative to the blocks 8 results in the expulsion of the chips or cuttings which have accumulated in the spaces between those portions of the bits or chasers which project into the central opening 5 of the die, the wiping members 8 effectually cleaning or removing the chips from the opening 5 and from the teeth in the chasers or bits 3.

From the foregoing description, it will be seen that the present cleaner performs its functions in a very simple and efficient manner and without interfering in any manner whatsoever with the operation of the screw threading apparatus and without requiring any change in the construction or mounting thereof. The alined openings 5 and 9 in the screw threading die and the carriage 26 are already present, so that the cleaning means may be conveniently introduced and set up without making any alterations in the apparatus aside from providing for the mounting of the eye bolts 16 on the stationary stop 17 of the base 23 of the screw threading machine.

I claim:—

1. Screw threading apparatus comprising a die having bits or chasers and provided with means for removing the chips or cuttings formed by the bits or chasers in the thread cutting operations, said means reciprocating with and relative to said bits and chasers.

2. Screw threading apparatus comprising an expanding die having bits or chasers and provided with expansible means for removing the chips or cuttings formed by the bits or chasers in the thread cutting operations, said means expanding with the die and reciprocating with and relative to said bits and chasers.

3. Screw threading apparatus comprising a die having bits or chasers and provided with means for removing the chips or cuttings formed by the bits or chasers in the thread cutting operations, said means consisting of a wiper member adapted to wipe the cuttings from between the bits or chasers during the retraction of the latter from the work.

4. Screw threading apparatus comprising a die having bits or chasers and provided with means for removing the chips or cuttings formed by the bits or chasers in the thread cutting operations, said means consisting of a wiper member adapted to wipe the cuttings from between the bits or chasers during the retraction of the latter from the work, and mechanical means for automatically moving said wiping member relative to the bits and chasers in the chip or cutting removing operation.

5. Screw threading apparatus including a carriage movable toward and away from the work and carrying a die having bits or chasers, and a wiper element disposed in alinement with the spaces between adjacent bits or chasers and in a position to wipe out the chips of cuttings during the retraction of the carriage.

6. Screw threading apparatus including a carriage movable toward and away from the work and carrying an expanding die having bits or chasers, and an expanding wiper element disposed in alinement with the spaces between adjacent bits or chasers and in position to wipe out chips or cuttings from between the chasers during the retraction of the carriage.

7. In screw threading apparatus, the combination of a carriage mounted to move toward and away from the work and carrying a die having bits or chasers, and means for removing the chips or cuttings, said means including a wiper supported upon a stationary part of the apparatus, in alinement with the space between adjacent bits or chasers, and in position to wipe out chips or cuttings from between the chasers during the retraction of the carriage, and adapted to move with and relative to said carriage in the operation of the apparatus.

8. In screw threading apparatus, the combination of a carriage movable toward and away from the work and carrying a sectional die provided with bits or chasers, said carriage and die having alined openings and affording a passage between the chasers, and a wiper provided with a stem mounted upon a fixed part of the apparatus, said wiper being supported in alinement with the opening in the carriage and in a position to be moved through the alined openings and wipe cuttings from the bits or chasers during the retraction of the carriage from the work.

9. In screw threading apparatus, the combination of a carriage movable toward and away from the work and carrying a sectional die provided with bits or chasers, said carriage and die having alined openings and affording a passage between the chasers, and a wiper provided with a stem mounted upon a fixed part of the apparatus, said wiper being supported in alinement with the opening in the carriage and in a position to be moved through the alined openings and wipe cuttings from said opening in the carriage during the retraction of the carriage from the work.

10. In screw threading apparatus, the combination of a carriage movable toward and away from the work, a die carried by the carriage and provided with a plurality of bits or chasers, the carriage and the die having openings alined with the space between the cutting ends of the bits or chasers, and means for removing chips or cuttings from the bits or chasers, said means including a sectional wiper supported by a stationary part of the apparatus, in alinement with the said openings, and in position to be introduced therein during the retraction of the carriage, and said wiper having grooves to receive the cutting ends of the bits or chasers.

In testimony whereof I have hereunto set my hand.

FRANK P. McMILLAN.

Copies of this patent may be obtained for five cents each, by addressing the "Commissioner of Patents, Washington, D. C."